(12) United States Patent
Keay

(10) Patent No.: US 7,140,626 B1
(45) Date of Patent: Nov. 28, 2006

(54) RUNNING EXERCISE BIKE

(76) Inventor: Peter W. Keay, 720 Riverwalk, Apt. 78, Corunna, MI (US) 48817

( * ) Notice: Subject to any disclaimer, the term of this patent is extended or adjusted under 35 U.S.C. 154(b) by 0 days.

(21) Appl. No.: 10/865,628

(22) Filed: Jun. 10, 2004

Related U.S. Application Data

(60) Provisional application No. 60/487,459, filed on Jul. 15, 2003.

(51) Int. Cl.
*B62M 17/00* (2006.01)

(52) U.S. Cl. .................. 280/230; 280/233; 280/242.1; 280/253

(58) Field of Classification Search ........ 280/230–233, 280/242.1, 243–247, 220, 221, 249, 250, 280/253; 482/51, 52, 57–65, 70
See application file for complete search history.

(56) References Cited

U.S. PATENT DOCUMENTS

| | | | | |
|---|---|---|---|---|
| 4,657,244 A | * | 4/1987 | Ross | 482/62 |
| 4,733,880 A | * | 3/1988 | Wilhelm, III | 280/234 |
| 4,798,395 A | * | 1/1989 | Shaffer et al. | 280/240 |
| 5,050,864 A | * | 9/1991 | Pertramer | 482/51 |
| 5,282,640 A | * | 2/1994 | Lindsey | 280/234 |
| 5,511,810 A | | 4/1996 | Tong | 280/233 |
| 5,611,757 A | * | 3/1997 | Rodgers, Jr. | 482/57 |
| 5,836,855 A | * | 11/1998 | Eschenbach | 482/57 |
| 5,873,590 A | * | 2/1999 | Abe et al. | 280/259 |
| 6,010,433 A | | 1/2000 | Chao | 482/57 |
| 6,017,295 A | * | 1/2000 | Eschenbach | 482/57 |
| 6,032,969 A | | 3/2000 | Kurgan et al. | 280/233 |
| 6,203,043 B1 | * | 3/2001 | Lehman | 280/288.1 |
| 6,299,189 B1 | * | 10/2001 | Chao | 280/220 |
| 6,386,328 B1 | | 5/2002 | Chen | 188/24.11 |
| 6,485,041 B1 | * | 11/2002 | Janssen | 280/221 |
| 6,540,306 B1 | | 4/2003 | Kanchisa | 301/59 |
| 6,557,657 B1 | | 5/2003 | Persson | 180/220 |
| 6,557,671 B1 | | 5/2003 | Kirimoto et al. | 188/26 |
| 6,659,234 B1 | | 12/2003 | Huang | 188/26 |
| 6,715,779 B1 | * | 4/2004 | Eschenbach | 280/221 |

FOREIGN PATENT DOCUMENTS

US 2001/0001305 5/2001 ............... 482/66

* cited by examiner

*Primary Examiner*—Lesley D. Morris
*Assistant Examiner*—L. Lum
(74) *Attorney, Agent, or Firm*—Young Basile

(57) ABSTRACT

An exercise apparatus including a seatless frame for simulating running without the stress producing loads associated with each stride. The exercise apparatus has at least one front wheel and at least one rear wheel, both of which are rotationally connected to the frame. The exercise apparatus includes two independent means for propelling the apparatus along a path of travel. The first means simulates a running motion via a pair of pedals that operate in an arcuate pattern. The second means for moving the apparatus along the path of travel includes a pair of hand actuated levers.

25 Claims, 6 Drawing Sheets

RUNNING EXERCISE BIKE

This application claims priority of U.S. Provisional Patent Application No. 60/487,459 filed Jul. 15, 2003.

FIELD OF THE INVENTION

The present invention relates to exercise bikes and, more particularly to exercise bikes that simulate running.

BACKGROUND OF THE INVENTION

People who prefer running for exercise tend to enjoy running outside for the continuous change in view and fresh air. Unfortunately, runners can develop many problems with their joints over time. The runner's knees and ankles absorb harsh pounding on every stride. Other problems can also occur over time, such as shin splints and/or back problems due to the harsh nature of running on a hard surface.

A relatively new invention designed to solve this problem is the elliptical exercise machine. The elliptical machine simulates running motion, but eliminates the harsh pounding on the rider's joints because the rider's feet never leave the pedal. The pedals provide continuous force on the rider's feet which eliminates the shock loading. These stationary machines are used in exercise gyms as well as in the home and office. The problem with prior art elliptical machines is that the rider is confined to a stagnant indoor environment. It would be desirable to provide a simulated running exercise machine that prevents the stress and strain on the runner's legs while still allowing the runner to exercise outdoors.

SUMMARY OF THE INVENTION

This invention provides an exercise apparatus including a seatless frame for simulating outdoor running without the stress producing loads associated with each stride. The exercise apparatus has at least one front wheel and at least one rear wheel, both of which are rotationally connected to the frame. The exercise apparatus includes two independent means for propelling the apparatus along a path of travel. The first means simulates a running motion via a pair of pedals that operate in an arcuate pattern. The second means for moving the apparatus along the path of travel includes a pair of hand actuated levers. The hand actuation levers propel the front wheel when the rider grips one end of each lever and reciprocates the levers back and forth. The levers include hand brakes that independently actuate brakes mounted adjacent the front and rear wheels. In addition, the hand actuation levers provide means for steering the apparatus by allowing the rider to turn the front wheel at a desired angle relative to the frame.

In a preferred embodiment of the invention, the apparatus includes two rear wheels spaced apart from one another connected together by an axle rotationally supported by the frame. The two rear wheels are operable to provide enhanced stability to the apparatus such that the rider is not required to balance the apparatus and can remain focused on exercising. The apparatus provides means for leg exercising by simulating running and means for arm exercising via the hand actuated levers. One advantage of the present invention is that the rider can exercise outside on real roads having hills and flat surfaces rather than having to simulate the real thing in a closed room environment.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
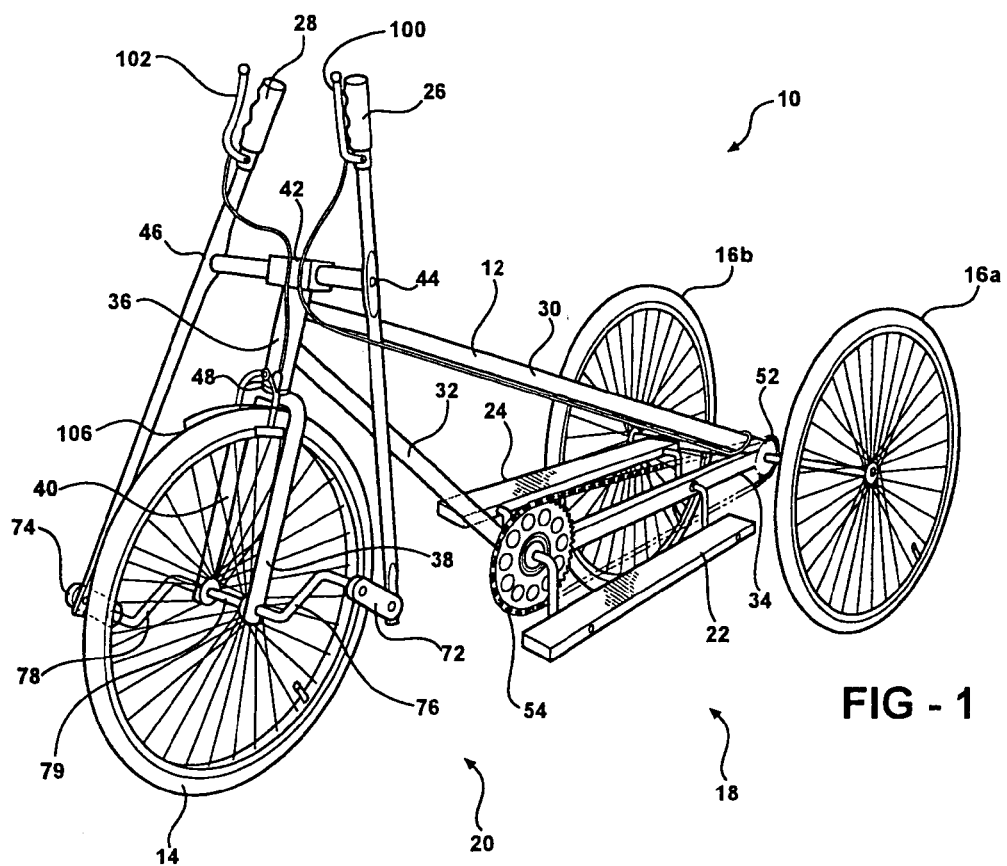
FIG. 1 is a perspective view of an exercise apparatus.
Figure 2:
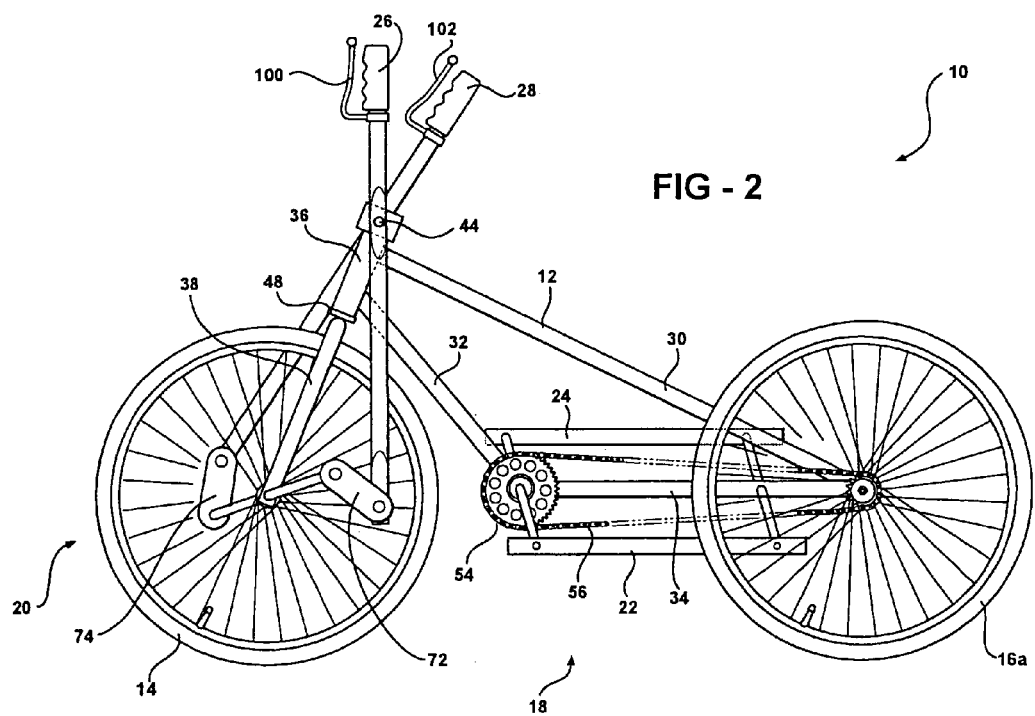
FIG. 2 is a side view of the exercise apparatus of FIG. 1.
Figure 3:
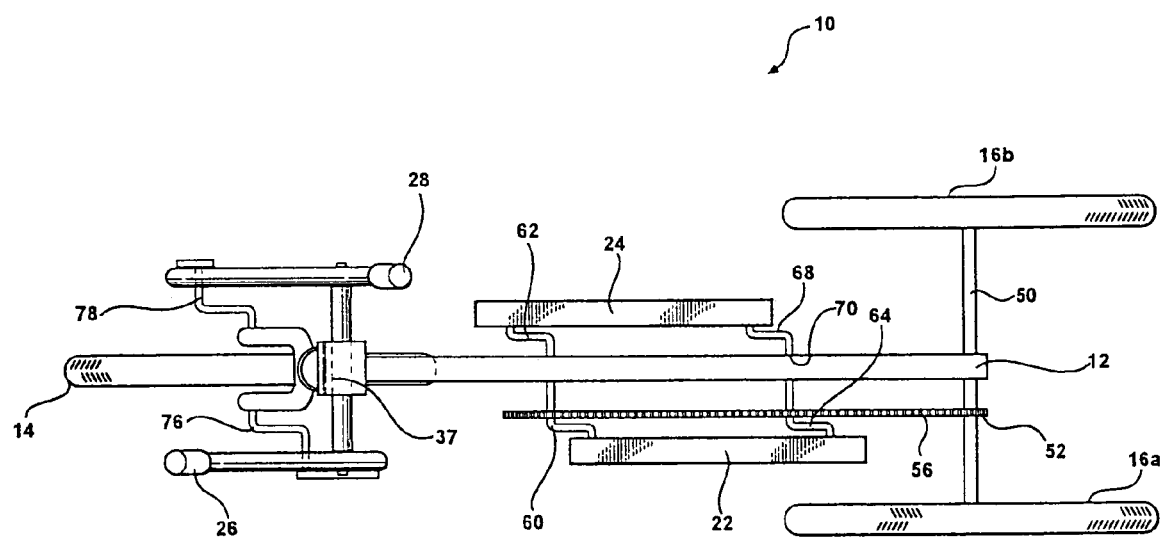
FIG. 3 is a top view of the exercise apparatus of FIG. 1.

Generally referring to the FIGS. 1–3, an exercise apparatus 10 is shown therein. The apparatus 10 is designed to simulate a running exercise as well as to provide a workout for the rider's arms in an outdoor environment. The apparatus 10 includes a seatless frame 12, at least one front wheel 14, and at least one rear wheel 16. In a first preferred embodiment, the apparatus 10 includes two rear wheels 16a, 16b. The wheels 14, 16 are rotationally connected to the frame 12.

The apparatus 10 provides two means 18, 20 for moving the apparatus along a path of travel. The first moving means 18 is operable for simulating running via a pair of pedals 22, 24 that operate in an arcuate pattern. A second means 20 for moving the apparatus along a path of travel includes first and second hand actuation levers 26, 28 that are used to drive the rotational movement of the front wheel 14. The levers 26, 28 can also be used to steer the apparatus 10

The frame 12 includes three legs 30, 32, 34 connected to one another in a substantially triangular shaped pattern. The first and second legs 30, 32 converge toward one another at the forward end of the apparatus 10. The first and second legs 30, 32 are fixedly attached to a tubular end piece 36 having an aperture 37 extending therethrough. A cross member 42 extends between the left and right actuation levers 26, 28 to pivotally support the left and right actuation members 26, 28 at pivots 44, 46, respectively. A lower extension 48 extends from the cross member 42 and concentrically through the tubular end piece 36 to a pair of front forks 38, 40. The front forks 38, 40 rotatably support the front wheel 14. The lower extension 48 is pivotable within the tubular end piece 36 such that when the left and right actuation levers 26, 28 are turned, the left and right forks 38, 40 will pivot in the same direction and thus turn the wheel 14 in the desired direction.

The first leg 30 and third leg 34 converge toward the rear of the exercise apparatus 10 and rotationally connect to an axle 50. The axle 50 extends between the rear wheels 16a, 16b. An axle sprocket 52 is fixedly connected to the axle 50. The axle sprocket 52 can include multiple gears (not shown) for reducing the torque load during hill climbing. The second and third legs 32, 34 of the frame 12 extend respectively from the front and the rear of the apparatus 10 toward an intermediate portion of the apparatus 10. A pedal sprocket 54 is rotatably mounted in a journal defined at the junction of legs 32, 34. The axle sprocket 52 and the pedal sprocket 54 each have teeth for engaging a chain 56. When the pedals 22, 24 are actuated, the pedal sprocket 54 begins to rotate and the chain then drives the axle sprocket 52 which, in turn, drives the axle 50 and the rear wheels 16a, 16b. The pedals 22, 24 are pivotally connected to the pedal sprocket 54 through crank arms 60, 62, respectively. The pedals 22, 24 are also pivotally connected to the frame 12 via rear crank arms 64, 68. The rear crank arms 64, 68 are connected to a rotating shaft 70 that extends through the third leg 34 to provide support for the rear portion of the pedals 22, 24. The axle sprocket 52 is a coaster type known to those skilled in the art to allow the apparatus to continue moving without pedaling.

The left and right actuation levers 26, 28 drive the front wheel 14 via pivot links 72, 74. The pivot links 72, 74 pivotally connect the levers 26, 28 to arms 76, 78 of a front wheel crank 79. The reciprocating force from the levers 26, 28 is transmitted through the links 72, 74 and into the crank arms 76, 78 which, in turn, rotates the wheel 14 to provide propulsion and thus move the apparatus 10 in a desired direction of travel.

In operation, the apparatus 10 functions as a hybrid cross of a stationary elliptical machine and a bicycle. The rider (not shown) steps onto the pedals 22, 24 and grabs the hand actuation levers 26, 28. The rider will remain in the standing position while riding the apparatus 10. The rider begins moving his or her legs in a running motion causing the pedals 22, 24 to move in an arcuate motion. The rider's feet stay in continuous contact with the pedals 22, 24 so that stress from the impact force that is normally transmitted through a runner's legs is eliminated. At the same time that the rider is simulating running, the rider's arms are moving the hand actuation levers 26, 28 back and forth in a reciprocating motion to propel the front wheel 14 in a rotational manner. When the rider wishes to slow down, a pair of brake handles 100, 102 operably attached to the hand levers 26, 28, can be squeezed, which causes a pair of brake pads 106 on the front wheel 14 (not shown in the rear) to grasp a rotating member to restrict the motion and thus slow down the apparatus 10. The rider can shift gears, similar to a typical bicycle, when going up and down hills. Multiple gears are not shown, but are well known to those skilled in the art. The rider can steer the apparatus 10 by using the actuation levers 26, 28 to turn the front wheel 14.

Figure 4:
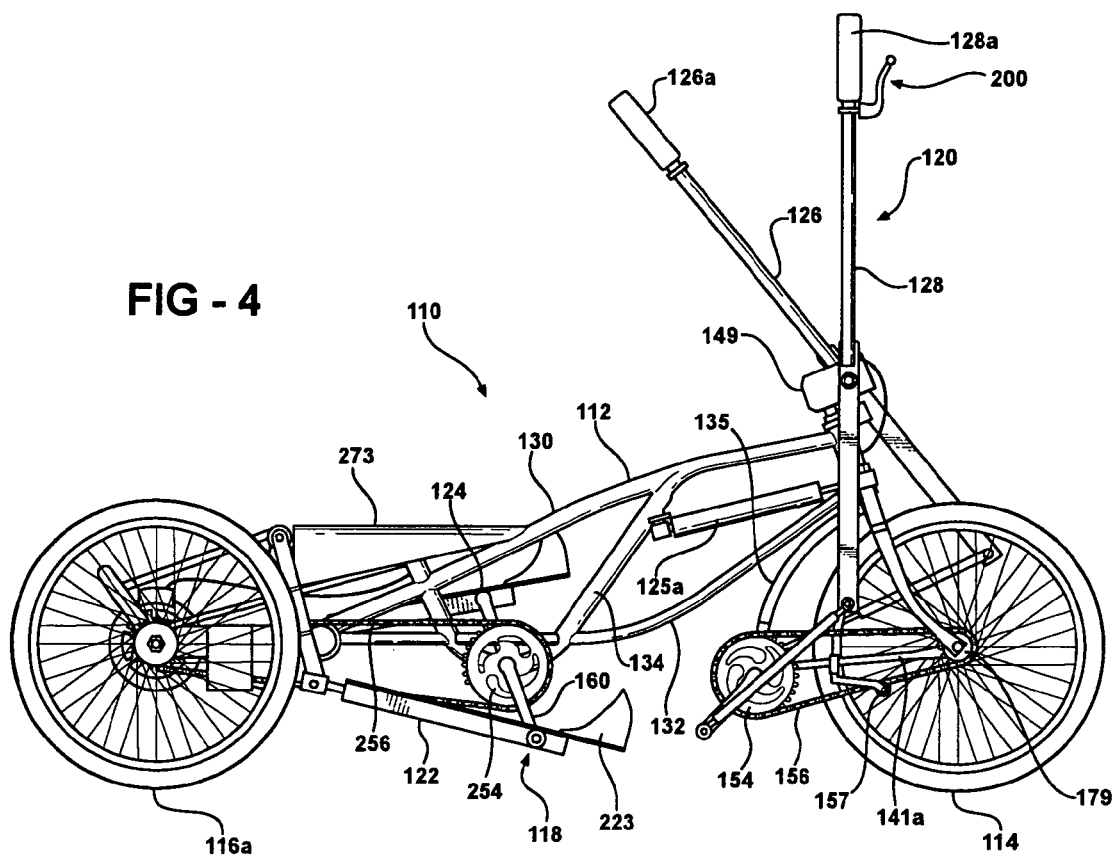
FIG. 4 is a side view of the second embodiment of the exercise apparatus.
Figure 5:
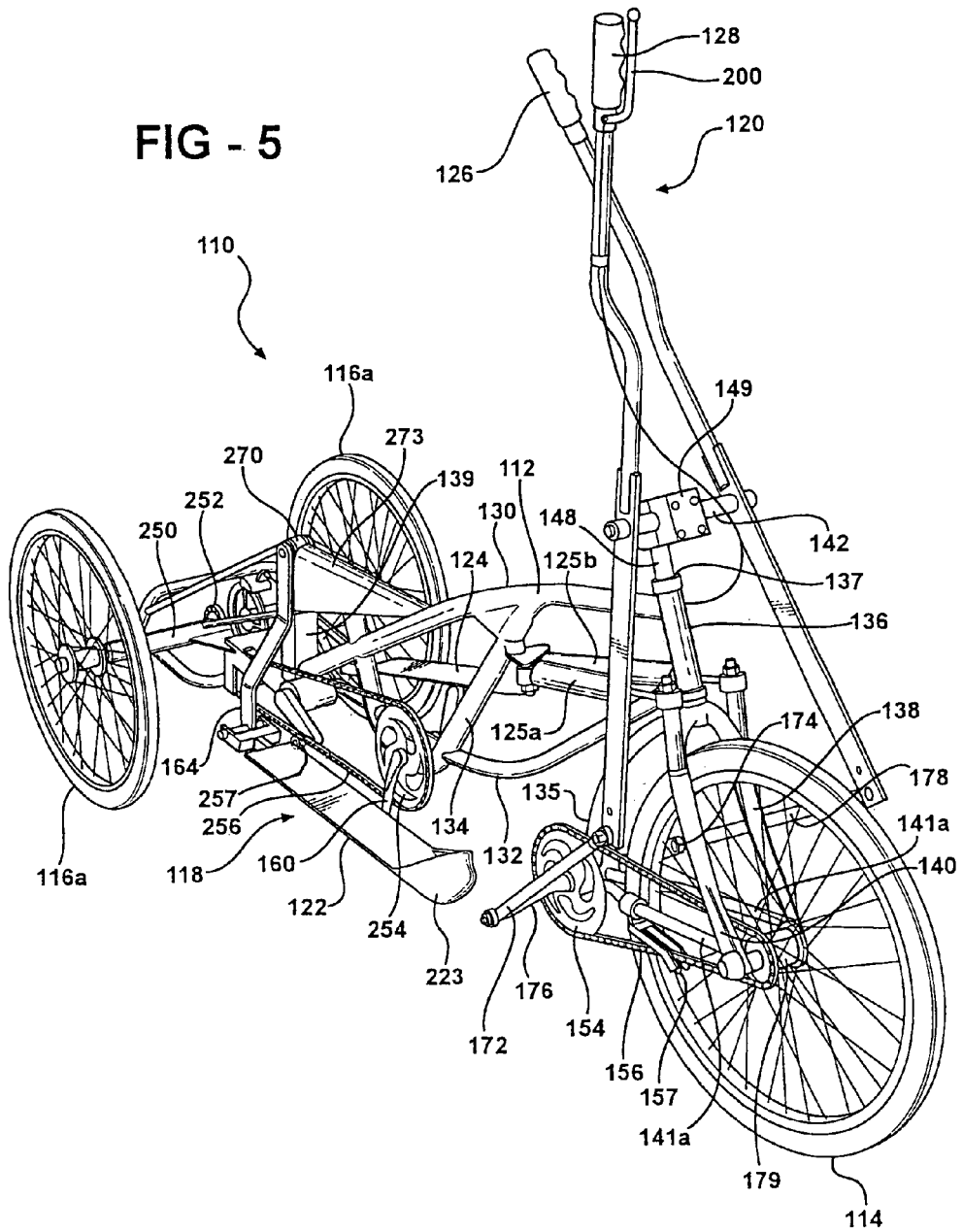
FIG. 5 is a perspective front view of a second embodiment of FIG. 4.
Figure 6:
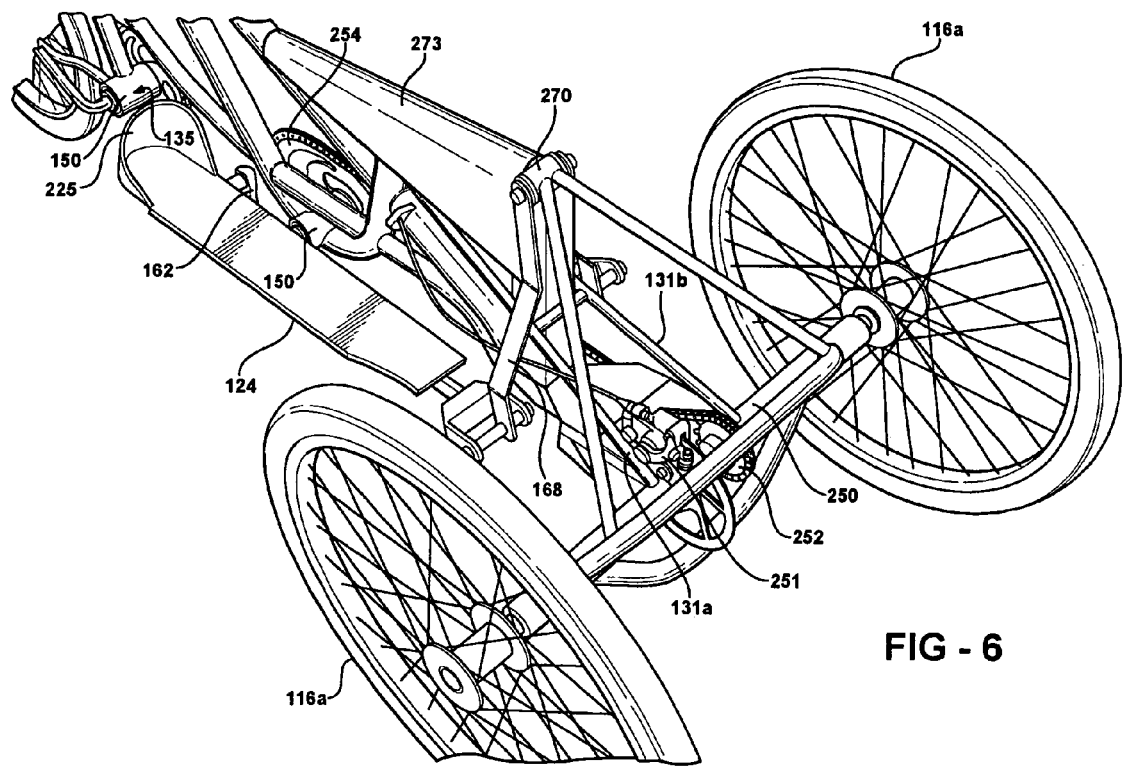
FIG. 6 is a perspective rear view of a portion of the exercise apparatus of FIG. 4.

A second and preferred embodiment is shown in FIGS. 4–6. In the second preferred embodiment, the apparatus 110 includes a seatless frame 112 having a front wheel 114 and two rear wheels 116a, 116b. The wheels 114, 116a, 116b are rotationally connected to the frame 112.

The second embodiment 110 provides two means 118, 120 for moving the apparatus 110 along a path of travel. The first moving means 118 is operable for simulating running via a pair of pedals 122, 124 that operate in an arcuate pattern. A second means 120 for moving the apparatus along a path of travel includes firsthand and secondhand actuation levers 126, 128 that are used to drive the rotational movement of the front wheel 114. The levers 126, 128 are also used to steer the apparatus 110.

The frame 112 includes three main legs 130, 132, 134. The first and second legs 130, 132 converge toward one another at the forward end of the apparatus 110. The first and second legs 130, 132 are fixedly attached to a tubular end piece 136 having an aperture 137 extending therethrough. At the upper end of the tubular end piece 136, an extension member 148 concentrically extends from the aperture 137. The extension member 148 is connected to a block junction member 149. Cross members 142 extend at right angles from the junction member 149 so that the cross members 142 extend between the left and right actuation levers 126, 128 to pivotally connect to and support the left and right actuation members 126, 128 and pivots 144, 146, respectively. A lower end of the extension 148 is connected to a pair of front forks 138, 140. The front forks 138, 140 rotatably support the front wheel 114. The front forks 138, 140 may be a single U-shaped piece connected to the lower end of the extension 148. The lower extension 148 is pivotable within the tubular end piece 136 such that when the left and right actuation levers 126, 128 are turned, the left and right forks 138, 140 will pivot in the same direction and thus turn the wheel 114 in the desired direction. The block junction member 149 provides strength and stability to the frame 112 and prevents twisting of the forward end of the apparatus 110 especially when turning the wheel 114 in the desired direction. Other features incorporated in the frame 112 to provide strength to the apparatus include a piston and rod device 125a, 125b which are connected to an upper portion of each of the left and right forks 138, 140. The opposing ends of the piston and rod devices 125a, 125b are bolted to the third leg 134. The piston and rod devices 125a, 125b have enough freedom to reciprocally move the piston relative to the rod, especially during travel over rough terrain, and also to provide stabilizers for preventing or minimizing torsional movement of the front wheel 114. The front end of the frame 112 further includes a wheel bracket 135 which is defined by an arcuate brace 135 spaced behind the front wheel 114. A first end of the arcuate brace 135 is connected to the tubular end piece 136. The opposing end of the arcuate brace 135 is non-rotatably connected to the front sprocket crank housing 150. The wheel bracket 135 also includes a pair of braces 141a, 141b extending from the front sprocket crank housing 150 to each side of the front wheel crank 179 adjacent to each fork 138, 140.

The left and right actuation levers 126, 128 drive the front wheel via pivot links 172, 174 and are pivotally connected to arms 176, 178 of a lever sprocket 154. The lever sprocket 154 is rotatably mounted adjacent to a lower end of one of the levers 126, 128. The lever sprocket 154 communicates with the front wheel crank 179 by way of a chain 156 which is engaged in the teeth of the lever sprocket 154 and front wheel crank 179. The reciprocating force from the levers 126, 128 is transmitted through the links 172, 174 and into the lever sprocket 154 which in turn drives the wheel crank 179 and rotates the chain 156 and thus the front wheel 114 to provide propulsion for moving the apparatus in a desired direction of travel. The lever sprocket 154 is a coaster-type known to those skilled in the art to allow the apparatus to continue moving without moving the actuation levers 125, 128.

The first leg 130 has a pair of leg segments 131a and 131b that diverge from a center portion of the first leg 130 and terminate at the rear axle 250 which extends between the rear wheels 116a, 116b. An axle sprocket 252 is fixedly connected to the axle 250. The axle sprocket 252 may include multiple gears (not shown) for reducing the torque load during hill climbing. The axle sprocket 252 may also be connected to a conventional disk brake 251 similar to a conventional disk brake used on a bicycle. The first and second legs 130, 132 of the frame 112 extend respectively from the front of the apparatus toward an intermediate portion of the apparatus 110. A pedal sprocket 254 is rotatably mounted in a journal defined at the junction of legs 130, 132. The pedal sprocket 254 is orientated to be located and connected to a forward portion of the pedals 122, 124, proximate to foot stops 223, 225 on the pedals 122, 124. The location of the pedal sprocket 254 relative to the pedals 122, 124 provides the needed inertia and allows for easier pedaling for rotating the rear wheels 116a, 116b. The axle sprocket 252 and the pedal sprocket 254 each have teeth for engaging a chain 256. When the pedals 122, 124 are actuated, the pedal sprocket 254 begins to rotate. The chain 256 then drives the axle sprocket 252 which, in turn, drives the axle 250 and the rear wheels 116a, 116b. The pedals 122, 124 are pivotally connected to the pedal sprocket 254 through crank arms 160, 162, respectively. The pedals 122, 124 are also pivotally connected to the frame 112 via crank arms 164, 168. The rear crank arms 164, 168 are connected to a rotating shaft 270 that extends through a vertical extension 139 that is connected to the first leg 130 of the frame 112 to provide support for the rear portion of the pedals 122, 124. The axle sprocket 252 is also a coaster-type known to those skilled in the art to allow the apparatus to continue moving without pedaling. A shield 273 may be placed over a portion of the chain 256 to prevent the rider from stepping on the chain 256 as he is getting on the apparatus 110. Each of the chains 56, 156 and 256 may include a chain guide in the form of a wheel 157 shown adjacent the front wheel 114 or a roller 257 shown adjacent pedal 122. Either configuration of the chain guide maintains the chains 156, 256 in the correct path.

The operation of the second preferred embodiment is similar to the operation of the first embodiment. In operation of the second and preferred embodiment, the rider steps onto the pedals 122, 124 and grabs the actuation levers 126, 128. The rider will remain in the standing position while riding the apparatus. The rider positions his or her feet within the foot stops 223, 225 of the pedals 122, 124. The rider begins moving his or her legs in a running motion causing the pedals 122, 124 to move in an arcuate motion. The rider's feet stay in continuous contact with the pedals within the pedal stops 223, 225 so that stress from the impact force that is normally transmitted through a rider's legs is eliminated. At the same time that the rider is simulating running, the rider's arms are moving the hand actuation levers 126, 128 back and forth in a reciprocating motion to propel the front wheel 114 in a rotational manner. When the rider wishes to slow down, hand brakes 200 within at least one of the handles 126a, 128a operably attach to one of the hand levers 126 or 128 can be squeezed which causes the disk brakes 251 in the rear axle to restrict the motion and thus slow down the apparatus. The disk brakes 251 are conventional and known in the industry. As in the first embodiment, the rider can shift gears, similar to a typical bicycle when going up and down hills. Multiple gears are not shown but are well-known to those skilled in the art. One gear hub can be located on the front wheel axle and one gear hub can be located on the rear wheels axle. Actuation means to change the gear to the front wheel 114 is located on one handle 126 or 128 while the actuation means to change the gear to the rear wheels 116a, 116b is located on the other handle 126 or 128 so that the gears for the legs and arms are independent from each other. The rider can steer the apparatus by using the actuation levers 126, 128 to turn the front wheel 114 similarly as done on a bicycle using its handlebars.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An exercise apparatus comprising:
   a seatless frame;
   at least one front wheel and a pair of rear wheels, each wheel rotationally connected to the frame;
   first means for moving the apparatus along a path of travel, the first moving means operable for simulating running via a pair of pedals that operate in an arcuate pattern, wherein one of the rear wheels is adjacent to one of the pedals, and the other rear wheel is adjacent the other pedal;
   second means for moving the apparatus along a path of travel, the second moving means including first and second hand actuation levers for driving rotational movement of the front wheel and for turning the front wheel at a desired angle relative to the frame, wherein each hand actuation lever includes first and second ends and an intermediate pivot point positioned between the first and second ends;
   at least one pivotal link connected to the second end of each hand actuation lever; and
   a torque transmitting member having first and second ends, th first end of the torque transmitting member connected to the front wheel and the second end of the torque transmitting member connected to one of the pivotal links.

2. The apparatus of claim 1, wherein the first end is operable for hand gripping, the intermediate pivot point is operably connected to the frame, and the second end is adjacent to and operably connectable through linkage to the front wheel wherein the second end and the intermediate pivot point are linearly spaced from each other along the actuation lever.

3. The apparatus of claim 2, wherein each hand actuation lever includes a hand brake, each hand brake operable for braking the front and rear wheels independently.

4. The apparatus of claim 2, wherein the first moving means further comprises:
   first and second rotational elements connectable to each pedal.

5. The apparatus of claim 4, wherein each pedal includes an elongated substantially planar member having first and second ends pivotally connected to the first and second rotational elements respectively.

6. The apparatus of claim 4, wherein the first rotational element includes a sprocket gear for engaging a drive chain connected to the rear wheels; and
   the second rotation element includes a rotatable shaft extending through the frame for connecting to each pedal.

7. The apparatus of claim 1 further comprising:
   means for changing gear ratios for controlling the force required to actuate the pedals.

8. The apparatus of claim 1 further comprising:
   a crank arm connected to one end of the pedal for transmitting pedal force through a sprocket gear.

9. An exercise apparatus comprising:
   a seatless frame;
   at least one front wheel and at least one rear wheel, each wheel rotationally connected to the frame;
   first means for moving the apparatus along a path of travel, the first moving means operable for simulating running via a pair of pedals that operate in an arcuate pattern, wherein a rear wheel is adjacent each of the pair of pedals; and second means for moving the apparatus along a path of travel, the second moving means including first and second hand actuation levers for driving rotational movement of the front wheel and for turning the front wheel at a desired angle relative to the frame, wherein each hand actuation level includes first and second ends and an intermediate pivot point positioned between the first and second ends, the first end operable for hand gripping, the intermediate pivot point operably connected to the frame, and the second end connected through linkage to the front wheel, wherein the second end is connected to the front wheel via a crank arm to a sprocket gear, wherein the actuation levers are pivotally connected to a vertical portion of the frame, wherein the frame includes a stabilizer connected between the vertical portion of the frame and an opposing portion of the frame, and wherein the stabilizer is a piston and rod device for preventing torsional movement of the front wheel.

10. The apparatus of claim 2 further comprising at least one pivotal link connected to the second end of each hand lever.

11. The apparatus of claim 1, wherein one of the hand actuation levers includes a hand brake operable for actuating a disc brake to the rear wheels.

12. The apparatus of claim 5 wherein each pedal has a foot hold for maintaining a foot of a rider on the elongated essentially planar member.

13. The apparatus of claim 2, wherein the actuation levers are pivotally connected to a vertical portion of the frame.

14. The apparatus of claim 13, wherein the frame includes a stabilizer connected between the vertical portion of the frame and an opposing portion of the frame.

15. The apparatus of claim 14, wherein the stabilizer is a piston and rod device for preventing torsional movement of the front wheel.

16. The apparatus of claim 6, wherein the sprocket gear is positioned adjacent to a front portion of one of the pedals for providing needed inertia for rotating the rear wheels.

17. An exercise apparatus comprising:
a seatless frame;
a front wheel rotationally connected to the frame;
and a pair of rear wheels rotationally connected to an axle, the axle rotatably connected to the frame;
first means for moving the apparatus along a path of travel, the first moving means operable for simulating running via a pair of pedals that operate in an arcuate pattern;
second means for moving the apparatus along a path of travel, the second moving means including first and second hand actuation levers for driving rotational movement of the front wheel and for turning the front wheel at a desired angle relative to the frame, wherein each of the first and second means for moving the apparatus along a path of travel further includes a sprocket and chain wherein each hand action lever includes first and second ends and an intermediate pivot point positioned between the first and second ends, the first end operable for hand gripping, the intermediate pivot point operably connected to the fame, and the second end connectable through at least one of a linkage, a spocket, and a chain to the front wheel at least one pivotal link connected to the second end of each hand actuation lever; and a torque transmitting member having first and second ends, the first end of the torque transmitting member connected to the wheel and the second end of the torque transmitting member connected to one of the pivotal links.

18. The apparatus of claim 17, wherein each hand actuation member includes a hand brake, each hand brake operable for braking the front and rear wheels independently.

19. The apparatus of claim 17, wherein the first moving means further comprises:
first and second rotational elements connectable to each pedal.

20. The apparatus of claim 19, wherein each pedal includes an elongated substantially planar member having first and second ends pivotally connected to the first and second rotational elements respectively.

21. The apparatus of claim 19, wherein the first rotational element includes a sprocket gear for engaging a drive chain connected to the rear wheel; and
the second rotation element includes a rotatable shaft extending through the frame for connecting to each pedal.

22. The apparatus of claim 17 further comprising:
a crank arm connected to one end of the pedal for transmitting pedal force through a sprocket and gear.

23. The apparatus of claim 22 further comprising:
a shield connected to the frame and overlaying at least a portion of the sprocket.

24. The apparatus of claim 17 further comprising:
a stabilizer defined by a piston and rod device connected to a front portion of the frame for minimizing torsional movement of the front wheel.

25. The apparatus of claim 17 further comprising:
means for stopping the apparatus, wherein the means for stopping the apparatus includes disk brakes actuated by a hand brake on one of the actuation members.

* * * * *